United States Patent
Bjerre et al.

(10) Patent No.: US 11,157,714 B2
(45) Date of Patent: Oct. 26, 2021

(54) METHOD FOR DETERMINING A FINGER MOTION ON A FINGERPRINT SENSOR

(71) Applicant: Fingerprint Cards AB, Gothenburg (SE)

(72) Inventors: Troels Bjerre, Valby (DK); Samuel Löfström, Gothenburg (SE)

(73) Assignee: Fingerprint Cards AB, Gothenburg (SE)

( * ) Notice: Subject to any disclaimer, the term of this patent is extended or adjusted under 35 U.S.C. 154(b) by 0 days.

(21) Appl. No.: 17/055,827

(22) PCT Filed: May 23, 2019

(86) PCT No.: PCT/SE2019/050471
§ 371 (c)(1),
(2) Date: Nov. 16, 2020

(87) PCT Pub. No.: WO2019/231380
PCT Pub. Date: Dec. 5, 2019

(65) Prior Publication Data
US 2021/0209329 A1 Jul. 8, 2021

(30) Foreign Application Priority Data

May 28, 2018 (SE) .................................... 1850645-1

(51) Int. Cl.
*G06K 9/00* (2006.01)
*G06T 7/30* (2017.01)
(Continued)

(52) U.S. Cl.
CPC ......... *G06K 9/00026* (2013.01); *G06F 3/017* (2013.01); *G06K 9/0002* (2013.01);
(Continued)

(58) Field of Classification Search
CPC ............. G06K 9/00026; G06K 9/0002; G06K 9/00087; G06T 7/30; G06T 7/20; G06F 3/017
See application file for complete search history.

(56) References Cited

U.S. PATENT DOCUMENTS 6,408,087 B1 6/2002 Kramer
7,129,926 B2 * 10/2006 Mathiassen ......... G06F 3/03547
345/157

(Continued)

FOREIGN PATENT DOCUMENTS

CN 107463897 A 12/2017
EP 1396812 A2 3/2004
(Continued)

OTHER PUBLICATIONS

International Search Report and Written Opinion for International Application No. PCT/SE2019/050471 dated Jul. 24, 2019, 12 pages.
(Continued)

*Primary Examiner* — Utpal D Shah
(74) *Attorney, Agent, or Firm* — RMCK Law Group, PLC (57) ABSTRACT

A method for determining a finger motion on a fingerprint sensor comprising a sensing area, the method comprises: receiving a finger on the sensing area of the fingerprint sensor; when an amount of sensor area coverage caused by the finger touching the sensing area is below a coverage threshold, acquiring images of a first type using a first image acquisition setting with the fingerprint sensor, when the amount of sensor area coverage is equal to or exceeds the coverage threshold, acquiring images of a second type using a second image acquisition setting with the fingerprint sensor, and determining a present motion of the finger on the fingerprint sensor based on the first type of images or the
(Continued)

second type of images depending on a present amount of sensor area coverage.

15 Claims, 5 Drawing Sheets

(51) Int. Cl.
  *G06F 3/01* (2006.01)
  *G06T 7/20* (2017.01)
(52) U.S. Cl.
  CPC ............ *G06K 9/00087* (2013.01); *G06T 7/20* (2013.01); *G06T 7/30* (2017.01)

(56) References Cited

U.S. PATENT DOCUMENTS

| | | | |
|---|---|---|---|
| 7,289,649 B1* | 10/2007 | Walley | G06K 9/00026 |
| | | | 283/68 |
| 8,594,391 B2* | 11/2013 | Machida | G06K 9/00335 |
| | | | 382/124 |
| 8,953,853 B2 | 2/2015 | Alameh et al. | |
| 9,721,137 B2* | 8/2017 | Benkley | G06K 9/32 |
| 9,721,142 B2 | 8/2017 | Russo | |
| 10,101,851 B2* | 10/2018 | Benkley, III | G06F 3/041661 |
| 10,102,411 B2* | 10/2018 | Lillie | G06F 3/0416 |
| 10,635,878 B2* | 4/2020 | He | G06K 9/00013 |
| 10,949,640 B2* | 3/2021 | Bjerre | G06K 9/0002 |
| 2004/0208348 A1 | 10/2004 | Baharav et al. | |
| 2005/0271259 A1* | 12/2005 | Lorch | G06K 9/00026 |
| | | | 382/124 |
| 2014/0093143 A1 | 4/2014 | Thompson et al. | |
| 2014/0333328 A1 | 11/2014 | Nelson et al. | |
| 2016/0180145 A1* | 6/2016 | Setterberg | G06K 9/00926 |
| | | | 382/124 |
| 2016/0246396 A1* | 8/2016 | Dickinson | G06F 3/03545 |
| 2016/0259542 A1 | 9/2016 | Chaudhri et al. | |
| 2017/0032165 A1 | 2/2017 | Hansen et al. | |
| 2017/0075700 A1 | 3/2017 | Abudi et al. | |
| 2017/0169277 A1 | 6/2017 | Benkley et al. | |
| 2017/0322675 A1* | 11/2017 | Wang | G06F 3/0416 |
| 2017/0368938 A1* | 12/2017 | Wild | G06F 3/04817 |

FOREIGN PATENT DOCUMENTS

| | | |
|---|---|---|
| EP | 3173974 A1 | 5/2017 |
| GB | 2407387 A | 4/2005 |
| WO | 2018009121 A1 | 1/2018 |

OTHER PUBLICATIONS

Extended European Search Report dated Jul. 9, 2021 for EP Application No. 19812114.7, 10 pages.

* cited by examiner

Coverage < coverage threshold

Fig. 5A

Coverage ≥ coverage threshold

Fig. 5B

Coverage < coverage threshold

METHOD FOR DETERMINING A FINGER MOTION ON A FINGERPRINT SENSOR

CROSS-REFERENCE TO RELATED APPLICATIONS

This application is a 371 U.S. National Stage of International Application No. PCT/SE2019/050471, filed May 23, 2019, which claims priority to Swedish Patent Application No. 1850645-1, filed May 28, 2018. The disclosures of each of the above applications are incorporated herein by reference in their entirety.

FIELD OF THE INVENTION

The present invention relates to a method for determining a finger motion on a fingerprint sensor. The invention also relates to a fingerprint sensing system and to an electronic device comprising such a fingerprint sensing system.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

In some applications, it would be desirable to be able to use finger touches on a fingerprint sensor for navigation control for an electronic device. With fingerprint sensor navigation, the user may be able to create navigation events by swiping the finger over the sensor. In order to create navigation events it would be desirable to be able to track finger movement on the fingerprint sensor.

One example of using a fingerprint sensor for navigation is described in U.S. Pat. No. 6,408,087 which discloses to control the position of a pointer on a screen by detecting changes in width of fingerprint ridges or position of pores.

However, with prior art solutions such as suggested by U.S. Pat. No. 6,408,087, the time resolution is limited by the processing power which is required for detecting the fingerprint ridges. Consequently, fast finger movements become difficult to detect.

Accordingly, there appears to be room for improvements with regards to using a fingerprint sensor for tracking finger movement.

SUMMARY

In view of above-mentioned and other drawbacks of the prior art, it is an object of the present invention to provide an improved method for determining a finger motion on a fingerprint sensor.

According to a first aspect of the present invention, it is therefore provided a method for determining a finger motion on a fingerprint sensor comprising a sensing area, the method comprises: receiving a finger on the sensing area of the fingerprint sensor; when an amount of sensor area coverage caused by the finger touching the sensing area is below a coverage threshold, acquiring a sequence of images of a first type using a first image acquisition setting with the fingerprint sensor, when the amount of sensor area coverage is equal to or exceeds the coverage threshold, acquiring a sequence of images of a second type using a second image acquisition setting with the fingerprint sensor, and determining a present motion of the finger on the fingerprint sensor based on the images of the first type or images of the second type depending on a present amount of sensor area coverage.

The present invention is based upon the realization that a finger motion of a finger can be determined based on acquired images of different types. The first and second types of images are acquired using different acquisition settings depending on the amount of sensor area coverage caused by the finger touching the sensing area.

Monitoring the sensor area coverage allow for tailoring the image acquisition setting according to the present coverage. For example, while the finger is touching only a portion of the sensor area, the movement of the finger may be relatively fast whereby the image acquisition settings may be selected to be suitable for capturing such relatively fast motion.

In order to improve the image acquisition performance the first and the second type of images are acquired subsequently and not interleaved. However, capturing the first type of images or the second type of images may be performed in any order. The type of image that is acquired only depends on the present amount of sensor coverage.

In embodiments, it may be comprised to dynamically switch between determining the motion of the finger based on the images of the first type or images of the second type depending on a present amount of sensor area coverage.

In some embodiments a motion of the finger may be determined based on a combination of images of the first type and images of the second type. Thus, an accumulated finger motion may be determined based on a combination of e.g. a set of images of the first type and a set of images of the second type. An accumulated finger motion is the motion determined from the first type of images combined with the motion determined from the second type of images. Note that further sets of e.g. the first type of images or the second type of images may be added for determining an ever further extended accumulated finger motion.

Accordingly, a finger motion may be determined based on a sequence of images of the first type, a sequence of images of the second type, or any combination of sequences of images of the first type and the second type.

The image quality may be higher with the second image acquisition setting than with the first image acquisition setting. The image quality may relate to image resolution, sharpness, etc.

In embodiments, the frame rate is higher with the first image acquisition setting than with the second image acquisition setting.

Thus, a low image quality and high frame rate image acquisition setting may be selected for monitoring changes in coverage only when coverage is changing in the beginning and the end of a touch. When the finger covers an area larger than the threshold coverage area, a high quality and lower frame-rate image acquisition setting for image registration based finger motion tracking may be used.

In embodiments, determining the motion of the finger may be based on image registration of the images of the second type. Image registration may include image intensity-based methods, image feature-based methods, as well as frequency-domain methods. The methods may rely on any transformation model or similarity measure. Such image registration type methods provide a powerful way of determining translations or rotations of the finger from differences between images of the second type.

In embodiments, determining the motion of the finger may be based on changes in sensor area coverage between the images of the first type. The changes in sensing area coverage may relate to tracking a leading edge or a trailing edge of a detected finger in the first type of images, or detecting a translation of the center of mass of the covered area.

Acquiring the first type of images may be performed using a selected sub-group of sensing elements in an array of sensing elements comprised in the fingerprint sensor. Thus, in order to provide the desired first image acquisition setting only a sub-group of sensing elements may advantageously be required. For instance, using fewer sensing elements enables a high frame rate compared to using the entire array of sensing elements.

In addition, acquiring the second type of images may be performed using only a selected sub-group of sensing elements in the array of sensing elements comprised in the fingerprint sensor, the selected sub-group of sensing elements is larger than selected sub-group of sensing elements used for acquiring the first type of images. Thus, in order to provide the desired second image acquisition setting a sub-group of sensing elements may advantageously be required that is larger than the sub-group used for the first image acquisition setting. For instance, using more sensing elements enables a high image quality compared to using fewer sensing elements.

In embodiments, the selected sub-group of sensing elements may comprise selected rows or columns of sensing elements separated by rows or columns of sensing elements not comprised in the selected sub-group of sensing elements.

According to a second aspect of the present invention, there is provided a fingerprint sensing system comprising: a finger sensing area for receiving a finger having a fingerprint topography; an array of sensing elements; fingerprint image acquisition circuitry connected to said array of sensing elements for acquiring fingerprint images indicating local distances between said sensing elements and said fingerprint topography; and image processing circuitry connected to said fingerprint image acquisition circuitry configured to: determine a present amount of sensor area coverage caused by the finger touching the sensing area; when the present amount of sensor area coverage caused by the finger touching the sensing area is below a coverage threshold, control the fingerprint image acquisition circuitry to acquire a sequence of images of a first type using a first image acquisition setting, when the present amount of sensor area coverage is equal to or exceeds the coverage threshold, control the fingerprint image acquisition circuitry to acquire a sequence of images of a second type using a second image acquisition setting, and provide a finger motion signal indicative of a motion of the finger on the fingerprint sensor sensing area based on the first type of images or the second type of images depending on a present amount of sensor area coverage.

In embodiments, the image quality may be higher with the second image acquisition setting than with the first image acquisition setting.

Further, in embodiments, the image acquisition frame rate may be higher with the first image acquisition setting than with the second image acquisition setting.

In some embodiments, each sensing element in the array of sensing elements may comprise an electrically conducting sensing structure; and the fingerprint acquisition circuitry may be connected to each of the sensing structures for providing sensing signals indicative of a capacitive coupling between each sensing structure and the finger in response to a change in potential difference between a finger potential of the finger and a sensing structure potential of the sensing structure. Thus, fingerprint sensing functionality may be provided in the form of a capacitive fingerprint sensor.

Moreover, each sensing structure may advantageously be provided in the form of a metal plate, so that the equivalence of a parallel plate capacitor is formed by the sensing structure (the sensing plate), the local finger surface, and a protective dielectric top layer (and any air that may locally exist between the local finger surface and the protective layer, depending on location of ridges and valleys in the fingerprint pattern). A change of the charge carried by the sensing structure resulting from the change in potential difference between the finger and the sensing structure is an indication of the capacitance of such a parallel plate capacitor, which is in turn an indication of the distance between the sensing structure and the finger surface. Thereby, an image of the fingerprint pattern can be acquired by means of determining the capacitive coupling between each sensing structure and the finger.

The sensing signals may be analog values indicative of a voltage, which may in turn be proportional to the capacitance of the capacitor constituted by the finger (or other conductive object in the vicinity of the finger detecting structure), the finger detecting structure and the dielectric material there between.

It should also be understood that an image need not be an optical image of the fingerprint topography, but may be a two-dimensional gray scale value representation of the fingerprint topography representing measurement signals provided by sensing elements in an array of sensing elements. Further, the fingerprint images for determining a finger motion need not be of such resolution that the fingerprint features are resolvable. The sensing elements may function according to any measurement principle capable of providing one or several parameter(s) indicating a depth dimension of the fingerprint topography. Such measurement principles include certain capacitive measurement techniques, and ultrasonic measurement techniques etc.

Further embodiments of, and effects obtained through this second aspect of the present invention are largely analogous to those described above for the first aspect of the invention.

According to a third aspect of the invention, there is provided an electronic device comprising: the fingerprint sensing system according to any one of the embodiments of the second aspect; and a device control unit configured to: execute a finger gesture event on the electronic device based on the determined finger motion.

In embodiments, the device controller may be configured to: interact with the fingerprint sensing system to authenticate a user based on a fingerprint representation; and perform at least one action only if the user is authenticated based on said fingerprint representation.

Further embodiments of, and effects obtained through this third aspect of the present invention are largely analogous to those described above for the first aspect and the second aspect of the invention.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the method and electronic device according to the present invention are mainly described with reference to a substantially square fingerprint sensor arranged adjacent to the touch display of a mobile phone.

It should be noted that this by no means limits the scope of the present invention, which equally well includes, for example, other electronic devices such as tablets, computers or watches. Furthermore, the fingerprint sensor may have any other shape. For instance, the fingerprint sensor may be provided as an elongated rectangle.

Figure 1:
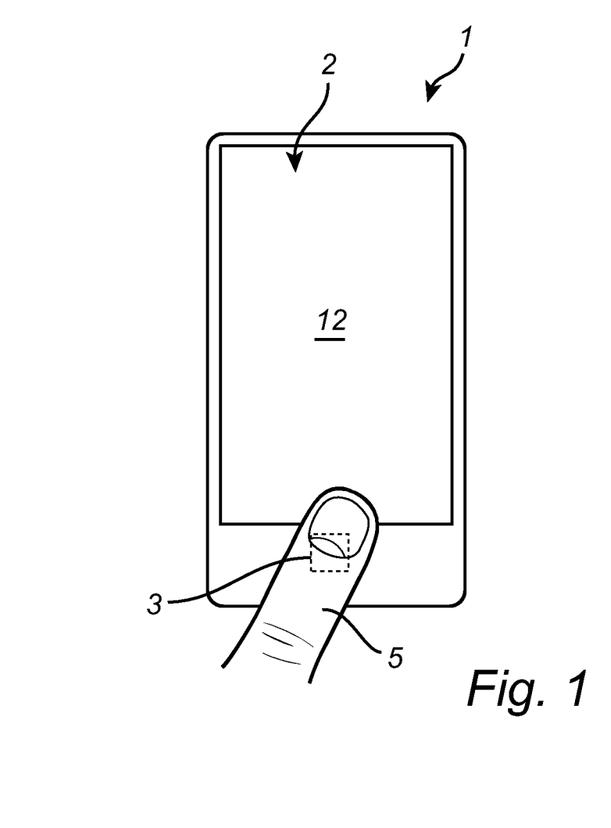
FIG. 1 schematically illustrates an electronic device including a fingerprint sensor according to an example embodiment of the present invention.

Referring to FIG. 1, an electronic device, here in the form of mobile phone 1, comprises a touch display 2 and a fingerprint sensor 3. The touch display 2 comprises a touch sensor for touch-based control of the mobile phone 1 and a display acting as a user interface.

In FIG. 1, a finger 5 of the user of the mobile phone 1 makes a finger touch on the surface of the fingerprint sensor 3. The finger touch may be made in connection with an authentication attempt. However, with the inventive concept the user may also navigate through menus and applications on the electronic device using finger gestures based on detected finger touch on the fingerprint sensor 3 surface. The user may move his/her finger across the fingerprint sensor surface whereby the finger motion is tracked by the fingerprint sensor using methods as will be described in more detail with reference to subsequent drawings.

Figure 2:
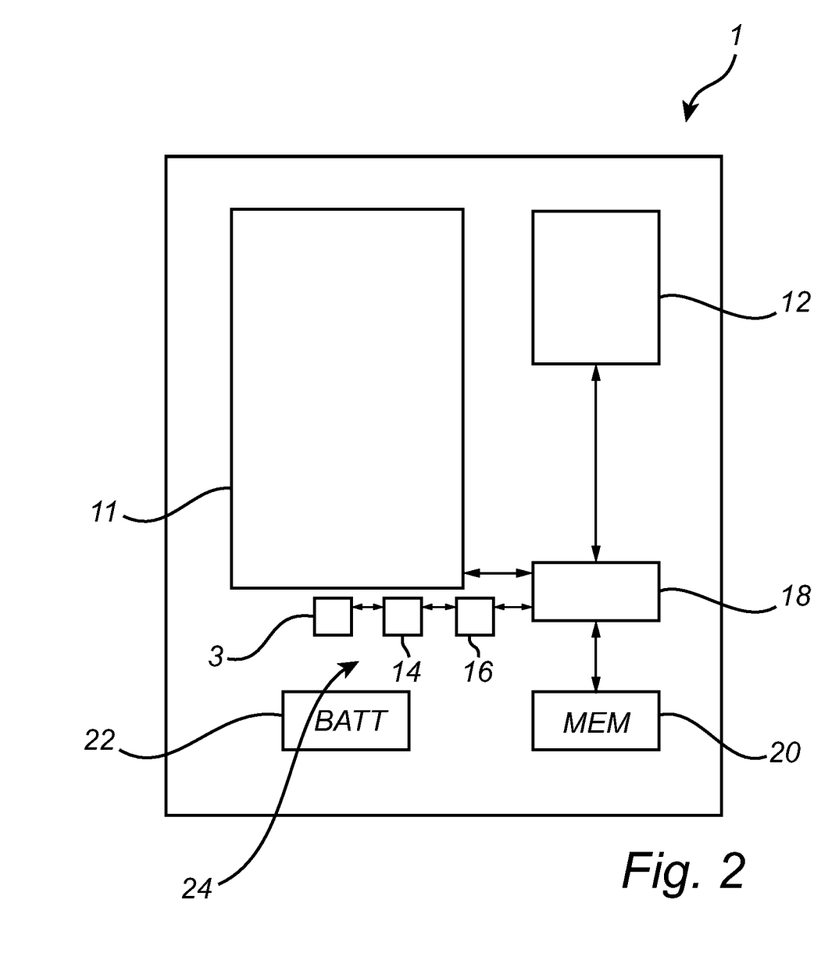
FIG. 2 is a block diagram of the electronic device in FIG. 1.

Referring to the block diagram in FIG. 2, the electronic device 1 in FIG. 1 comprises, in addition to the fingerprint sensor 3, a touch sensor 11, a display 12, fingerprint image acquisition circuitry 14, image processing circuitry 16, a device control unit 18, a memory 20, and a battery 22 for providing electrical energy to the various components of the electronic device 1. Although not shown in FIG. 2, the electronic device may comprise further components depending on application. For instance, the electronic device 1 may comprise circuitry for wireless communication, circuitry for voice communication, a keyboard etc.

Figure 3:
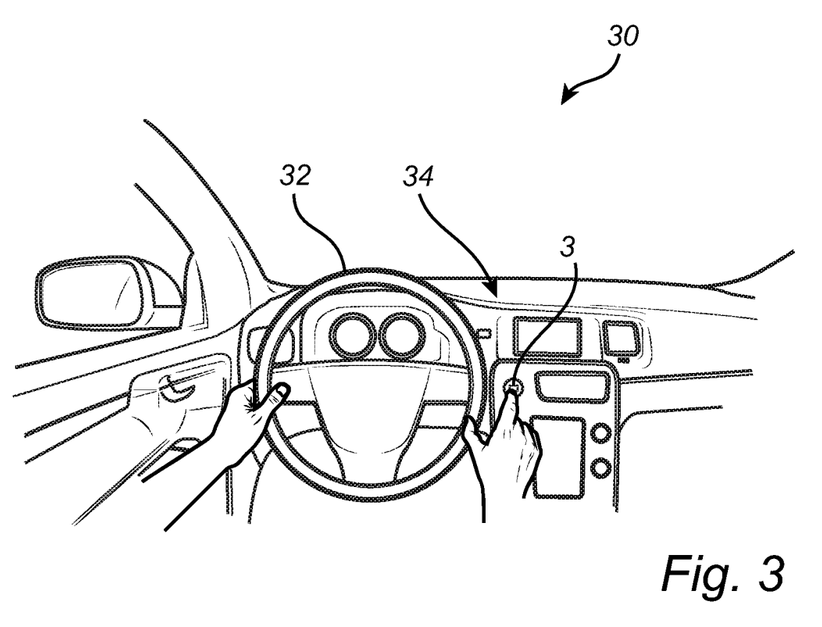
FIG. 3 schematically illustrates a vehicle interior with an electronic entertainment system including a fingerprint sensor according to an example embodiment of the present invention.

In a further possible implementation of the invention the fingerprint sensor 3 may be comprised in a vehicle 30 as conceptually illustrated in FIG. 3. The fingerprint sensing system 24 (FIG. 2) of the fingerprint sensor 3 may for example be configured for identification of a driver or a passenger in order to configure an electronic vehicle system such as electronic entertainment system according to personalized settings. The fingerprint sensing system 24 is also configured for navigation of menus or controlling settings of the entertainment system or another electronic vehicle system via finger gesture control based on tracking finger motion on the fingerprint sensor 3. Thus an electronic device in accordance with the inventive concept may be an electronic vehicle system such as an electronic entertainment system of a vehicle.

The finger touch surface of the fingerprint sensor 3 for receiving a finger may for example be arranged on the steering wheel 32, or as illustrated in FIG. 3 in relation to the control panel 34 either in the front seat of the vehicle or for passengers in the rear seat. Exemplary functionalities include that user input in one direction across the finger touch surface of the fingerprint sensor 3 may control the sound volume of an entertainment system in the vehicle and left/right user input may control music track selection. Additional user input may comprise moving around on an electronic map in a GPS.

Figure 4:
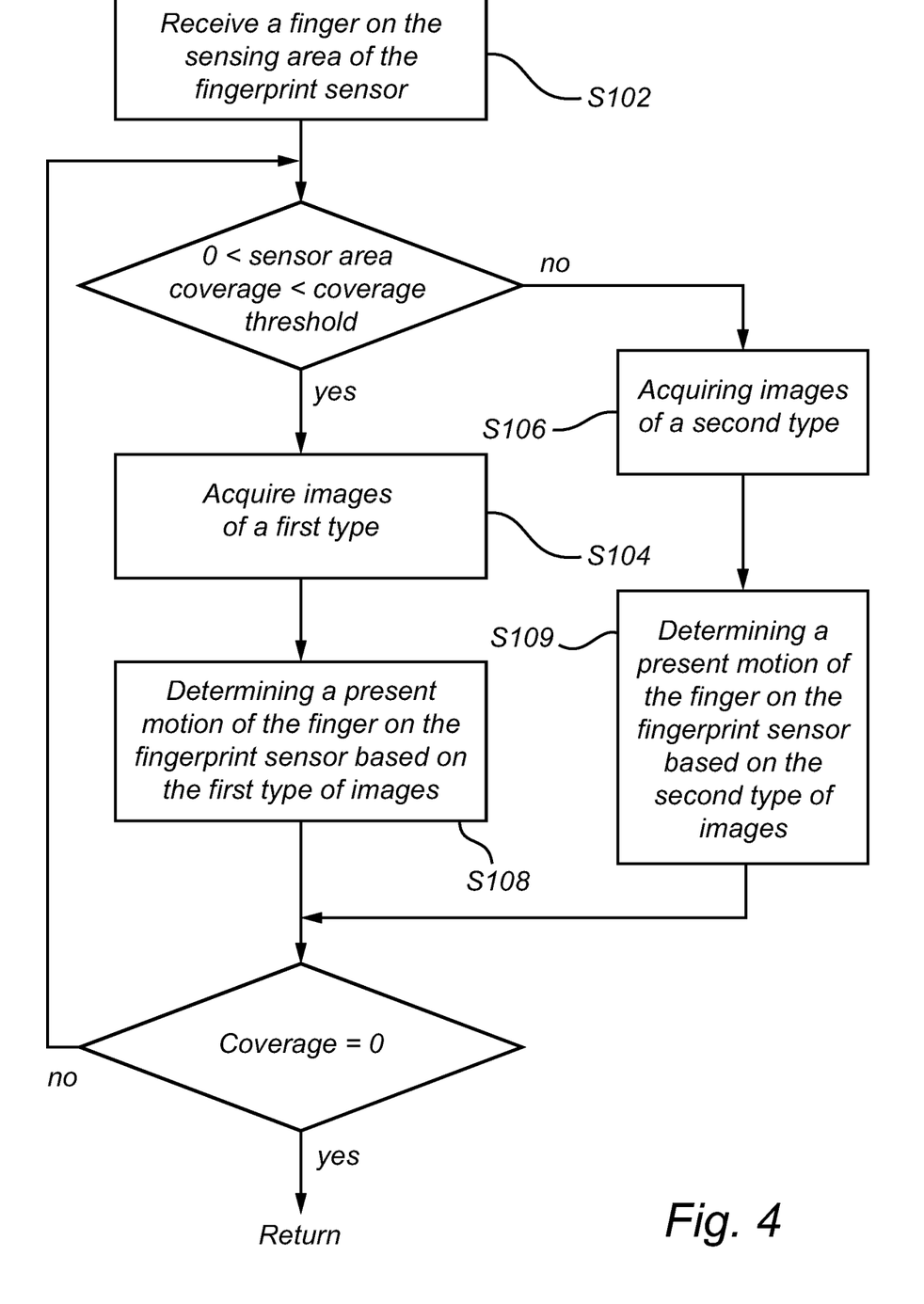
FIG. 4 is a flow-chart of method steps according to example embodiments of the invention.

An example embodiment of the method according to the present invention will now be described with reference to the flow-chart in FIG. 4, together with the illustrations in additional figures as indicated below.

Figure 5A:
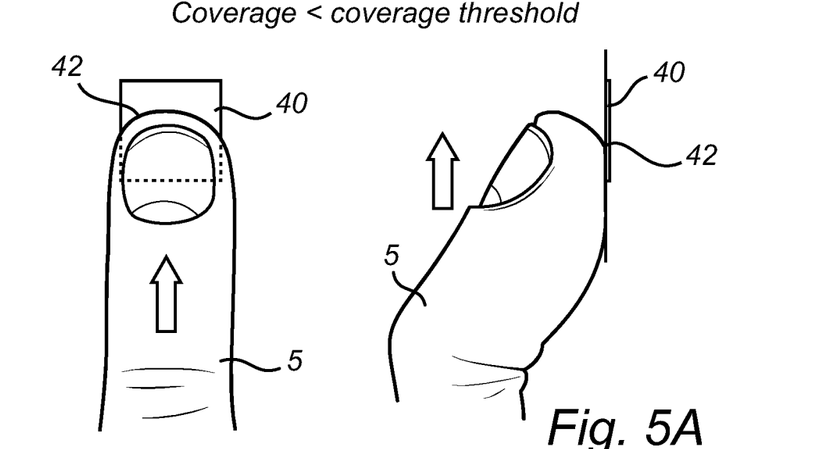
FIG. 5A-C conceptually illustrates a finger motion on a sensing area of a fingerprint sensor.

Firstly, a finger is received (step S102) on the sensing area 40 of the fingerprint sensor 3, see FIG. 5A. The finger 5 is detected by at least a portion of the sensing elements of the sensing area 40. The finger detection may be based on determining that a sensing signal from a plurality of sensing elements exceeds a detection threshold. As a result of the detection of the finger 5 (or finger candidate), at least a portion of the sensing element array of the fingerprint sensor 3 is activated, as well as the image acquisition circuitry 14 and the image processing circuitry 16. Depending on the implementation, other parts of the electronic device 1, such as the display 12 etc. may remain inactive at this stage.

Next, the sensor area coverage caused by the finger touch on the sensing area 40 is determined. Depending on the relationship between present sensor area coverage and a coverage threshold different types of images are acquired using the fingerprint sensor 3.

While the coverage caused by the finger 5 on the sensing area 40 is below a coverage threshold, but larger than 0% coverage as illustrated in FIG. 5A, images of a first type are acquired in step S104. This first type of images may be of a relative low quality in order to facilitate using a high frame rate acquisition. The quality of the first type of images need only be sufficient to detect which portions of the sensing area 40 are covered by the finger 5. The motion of the finger 5 may be determined by detecting changes in sensor area coverage between subsequently acquired images of the first type. In this way may for example the leading edge 42 of the finger coverage be tracked on the sensing area 40.

Accordingly, a present motion of the finger on the fingerprint sensor may be determined in step S108 based on the first type of images. As long as the sensor area coverage is below the coverage threshold, but larger than 0%, is further images of the first type acquired and the motion of the finger is determined based on the images of the first type.

Figure 5B:
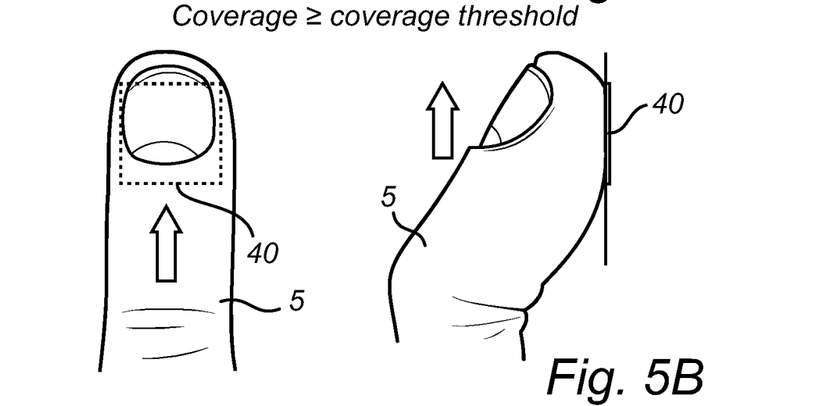

As the finger moves across the sensing area, the finger coverage on the sensing area 40 may at some point be equal to or even exceed threshold coverage as conceptually illustrated in FIG. 5B. In this case, while the amount of sensor area coverage is equal to or exceeds the coverage threshold, images of a second type are acquired with the fingerprint sensor in step S106 using a second image acquisition setting. The second type of images may be acquired with a relatively high quality, i.e. a higher quality than the image quality of the first type of images.

Acquiring higher quality images enables tracking more subtle finger motions, thus a higher resolution (i.e. high gesture granularity) for finger motion determination is possible. For example, a finger tap may be possible to distinguish by determining that the finger has been static on the sensing areas 40 for a predetermined threshold time period.

Determining a finger motion based on the second type of images may be performed by image registration methods applied to a sequence of second type images. Image registration provides a means for comparing the second type of images with each other for determining spatial transformations between images of the second type. Image registration methods are per se known to the skilled person.

Accordingly, a present motion of the finger on the fingerprint sensor may be determined in step S109 based on the second type of images.

As long as the sensor area coverage exceeds or is equal to the coverage threshold is further images of the second type acquired and the motion of the finger is determined based on the images of the second type. In other words, the finger motion is continuously tracked based on images of the second type as long as the sensor area coverage exceeds or is equal to the coverage threshold.

Figure 5C:
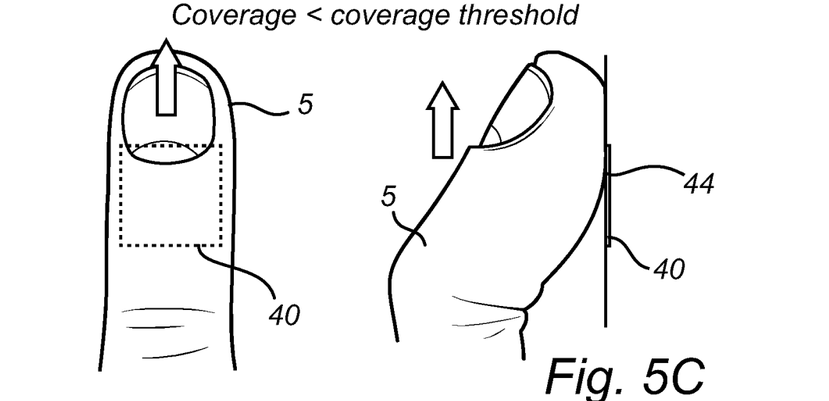

Furthermore, if the finger 5 continues to move across the fingerprint sensing area 40, the coverage caused by the finger may again become less than the coverage threshold as shown in FIG. 5C. Thus, images of a first type are acquired (step S104) since now the sensor coverage area is again less than the coverage threshold. In the finger coverage situation shown in FIG. 5C, with the finger moving in a direction with decreasing coverage the trailing edge 44 may be tracked in order to determine the finger motion. The tracking of the trailing edge 44 may be performed by detecting changes in sensor area coverage between subsequently acquired images of the first type.

The finger motion is in the above described by means of tracking a leading or trailing edge of the finger coverage area on the fingerprint sensor.

According to another possible implementation is a center of mass of the sensor coverage area tracked for determining the finger motion based on the images of the first type.

Furthermore, determining the finger motion may be performed based on two subsequent images of the first type or the second type. Another possible implementation is to estimate the finger motion based on a reference image and the latest image in a sequence of images of the first type or the second type. The reference image may be updated according to some criterion, e.g. when the determined finger translation is above a threshold. Other methods include temporal averaging or filtering of translations estimated between images in sequences of images of the first type or the second type or a combination thereof, including but not limited to Kalman filtering.

The sensor area coverage is estimated continuously, based on every captured image whether of the first type or the second type.

Accordingly, as illustrated by the conceptual finger motion in FIGS. 5A-C, an accumulated finger motion may be determined based on a combination of images of the first type and images of the second type.

Furthermore, in case the finger is lifted from the sensor and the sensor coverage is equal to zero, e.g. after determining a finger motion in steps S108 or S109, then the method returns to its initial stage, waiting to receive a finger on the sensing area of the fingerprint sensor.

Although the sequence of the finger motion illustrated in FIGS. 5A-C shows a motion starting from low sensing area coverage (FIG. 5A) and moving towards high sensing area coverage (FIG. 5B), a finger motion may equally well, and within the scope of the inventive concept start from high sensing area coverage (FIG. 5B) and move towards low sensing area coverage (FIG. 5A or FIG. 5C).

The coverage threshold may be in the range of 75-100% of the sensing elements in the array of sensing element, for example, 78%, or 80%, or 85%, or 92%, or 95%, or 98%, or 100% of the sensing elements in the array of sensing elements may be a suitable coverage threshold.

Determining the present coverage may be realized by the same method as detecting the finger, i.e. determining that a sensing signal from a plurality of sensing elements exceeds a detection threshold, and calculate the coverage based on the number of sensing elements in the plurality of sensing elements that indicates a finger detect in relation to the total number of sensing elements in the array.

Acquiring the first type of images or the second type of images may be performed using only subsets of sensing elements in the array of sensing element of the fingerprint sensor as will be described with reference to FIGS. 6A-B.

Figure 6A:
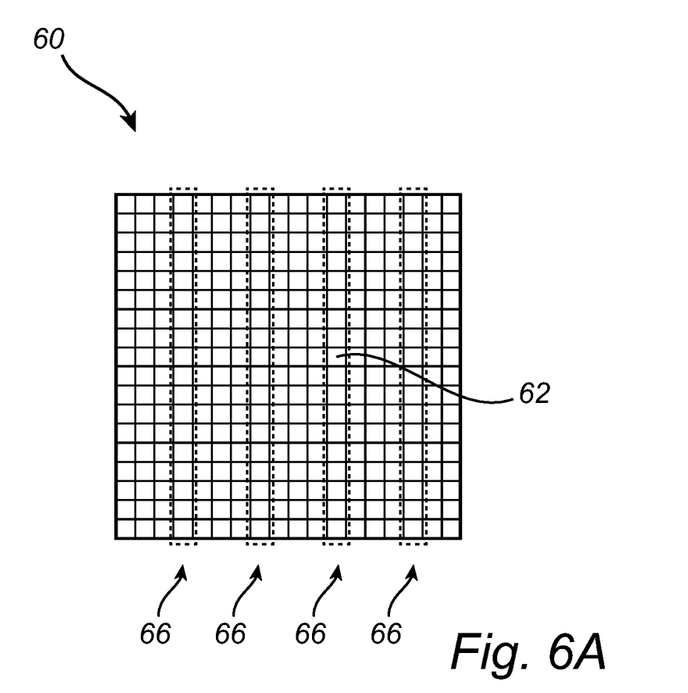
FIG. 6A conceptually illustrates an array of sensing elements comprising sub-groups of sensing elements.

FIG. 6A illustrates an array 60 of sensing elements 62 (only one is numbered), generally referred to as "pixels". In FIG. 6A is a sub-group of sensing elements indicated. The subgroup of sensing elements is here illustrated as selected columns 66 of sensing elements. However, it is also possible to use selected rows of sensing elements.

For acquiring the first type of images having a relatively low image quality, only the sub-group of sensing elements comprising selected columns may be activated. The sub-group of sensing elements may for example comprise every fourth, fifth, sixth, seventh, eighth, ninth, or tenth column of the array 60 of sensing elements 62, and is not limited to the described example embodiment showing every fourth column 66 as the subgroup of sensing elements. It should be understood that it is the accumulated columns 66 that form a single subgroup.

Figure 6B:
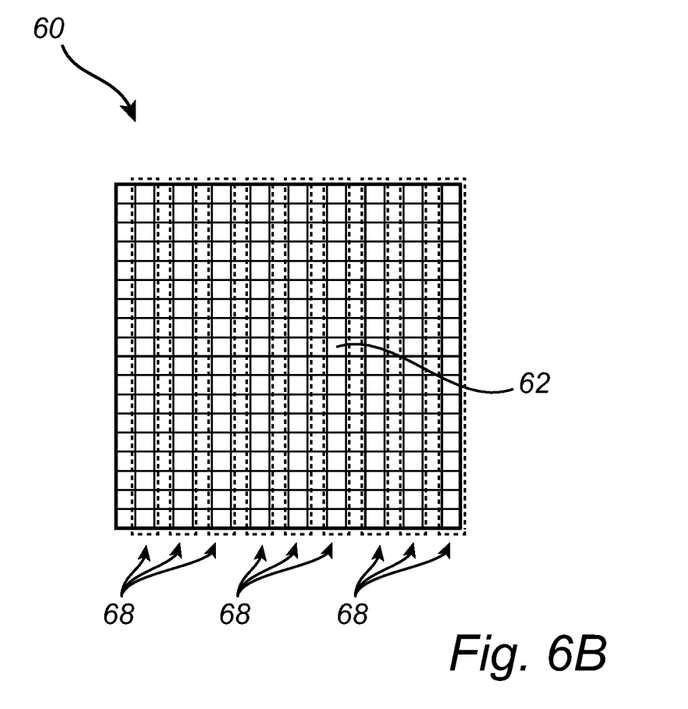
FIG. 6B conceptually illustrates an array of sensing elements comprising sub-groups of sensing elements.

FIG. 6B also illustrates the array 60 of sensing elements 62 (only one is numbered), generally referred to as "pixels". In FIG. 6B is another subgroup of sensing elements indicated. Also in FIG. 6b is the subgroup of sensing elements is illustrated as selected columns 68 of sensing elements. However, it is also possible to use selected rows of sensing elements.

For acquiring the second type of images having a relatively high image quality, the sub-group of sensing elements comprising selected columns of sensing elements may be activated. The sub-group of sensing elements may for example comprise every second or third column of the array 60 of sensing elements 62, or the entire array 60 or sensing elements 62. In the illustrated example embodiment is every second column 68 indicated as an accumulated sub-group of sensing elements used for acquiring images of the second type.

The selected sub-group of sensing elements used for acquiring the second type of images is larger than the selected sub-group of sensing elements used for acquiring the first type of images. In this way, the image quality is higher in the second type of images than in the first type of images.

It is understood from FIGS. 6A-B that the first acquisition setting and the second acquisition setting may thus comprise to only use the selected sub-groups of sensing elements acquiring images.

It should be understood that the number of sensing elements in the array 60 is only conceptually shown for exemplary purposes. In a real sensing element array there may be for example 160×160 sensing elements.

A control unit (e.g. a controller) in the invention may include a microprocessor, microcontroller, programmable digital signal processor or another programmable device. The control unit may also, or instead, each include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the fingerprint sensor, or may be part of the electronic device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for determining a finger motion on a fingerprint sensor comprising a sensing area, the method comprises:
   receiving a finger on the sensing area of the fingerprint sensor;
   when an amount of sensor area coverage caused by the finger touching the sensing area is below a coverage threshold, acquiring a sequence of images of a first type using a first image acquisition setting with the fingerprint sensor,
   when the amount of sensor area coverage is equal to or exceeds the coverage threshold, acquiring a sequence of images of a second type using a second image acquisition setting with the fingerprint sensor, wherein the image quality is higher with the second image acquisition setting than with the first image acquisition setting, and
   determining a present motion of the finger on the fingerprint sensor based on the images of the first type or images of the second type depending on a present amount of sensor area coverage.

2. The method according to claim 1, comprising dynamically switching between determining the motion of the finger based on the images of the first type or images of the second type depending on a present amount of sensor area coverage.

3. The method according to claim 1, comprising determining a motion of the finger based on a combination of an images of the first type and images of the second type.

4. The method according to claim 1, comprising determining a motion of the finger based on a sequence of images of the first type, a sequence of images of the second type, or any combination of sequences of images of the first type and the second type.

5. The method according to claim 1, wherein the frame rate is higher with the first image acquisition setting than with the second image acquisition setting.

6. The method according to claim 1, comprising:
   determining the motion of the finger based on image registration of the images of the second type.

7. The method according to claim 1, comprising:
   determining the motion of the finger based on changes in sensor area coverage between the images of the first type.

8. The method according to claim 1, comprising:
   acquiring the first type of images using a selected sub-group of sensing elements in an array of sensing elements comprised in the fingerprint sensor.

9. The method according to claim 1, comprising:
   acquiring the second type of images using only a selected sub-group of sensing elements in an array of sensing elements comprised in the fingerprint sensor, the selected sub-group of sensing elements is larger than the selected sub-group of sensing elements used for acquiring the first type of images.

10. The method according to claim 8, wherein the selected sub-group of sensing elements comprises selected rows or columns of sensing elements separated by rows or columns not comprised in the selected sub-group of sensing elements.

11. A fingerprint sensing system comprising:
   a finger sensing area for receiving a finger having a fingerprint topography;
   an array of sensing elements;

fingerprint image acquisition circuitry connected to said array of sensing elements for acquiring fingerprint images indicating local distances between said sensing elements and said fingerprint topography; and image processing circuitry connected to said fingerprint image acquisition circuitry, the image processing circuitry is configured to:
- determine a present amount of sensor area coverage caused by the finger touching the sensing area;
- when the present amount of sensor area coverage caused by the finger touching the sensing area is below a coverage threshold, control the fingerprint image acquisition circuitry to acquire a sequence of images of a first type using a first image acquisition setting,
- when the present amount of sensor area coverage is equal to or exceeds the coverage threshold, control the fingerprint image acquisition circuitry to acquire a sequence of images of a second type using a second image acquisition setting, wherein the image quality is higher with the second image acquisition setting than with the first image acquisition setting, and
- provide a finger motion signal indicative of a motion of the finger on the fingerprint sensor sensing area based on the first type of images or the second type of images depending on a present amount of sensor area coverage.

12. The fingerprint sensing system according to claim 11, wherein the image acquisition frame rate is higher with the first image acquisition setting than with the second image acquisition setting.

13. The fingerprint sensing system according to 12 claim 11, wherein:
- each sensing element in said array of sensing elements comprises an electrically conducting sensing structure; and
- the fingerprint acquisition circuitry is connected to each of said sensing structures for providing sensing signals indicative of a capacitive coupling between each sensing structure and said finger in response to a change in potential difference between a finger potential of said finger and a sensing structure potential of said sensing structure.

14. An electronic device comprising:
the fingerprint sensing system according to claim 11; and
a device control unit configured to:
- execute a finger gesture event on the electronic device based on the determined finger motion.

15. The electronic device according to claim 14, wherein the device controller is configured to:
- interact with the fingerprint sensing system to authenticate a user based on a fingerprint representation; and
- perform at least one action only if the user is authenticated based on said fingerprint representation.

* * * * *